Patented June 14, 1938

2,120,585

UNITED STATES PATENT OFFICE 2,120,585

MOLDABLE COMPOSITIONS

Johnstone E. Weelands, Verona, N. J., assignor to Bakelite Corporation, New York, N. Y., a corporation of Delaware No Drawing. Application January 16, 1937, Serial No. 120,884

6 Claims. (Cl. 106—22)

The present invention relates to moldable synthetic resin compositions and more particularly to compositions of phenol-aldehyde resins of a moldable character.

Synthetic resins have a transparency or translucency which it is frequently desirable to retain in articles made from them; to accomplish this end inert fillers and similar opacifying materials must be omitted. The customary practice followed for obtaining articles of a transparent or translucent appearance from synthetic resins is that of casting a resin while liquid into a mold of simple shape approximating that of the finished article and causing the resin to set up to a solid state while in the mold. The time required for hardening a cast resin is usually hours or even days, and the hardened cast article roughly approximating the finished shape is then machined as by turning, boring, sawing, drilling and polishing into the finished piece. The casting process accordingly is time consuming, and considerable labor and expense are involved in finishing the roughly cast piece.

A procedure for preparing articles from synthetic resins, which basically differs from the casting process, is that of plastic or hot-press molding. This method requires that a resinous composition be in a powdered solid state (not liquid as in the casting process) but with sufficient plasticity under the combined action of heat and mechanically-applied pressure to have a restricted flow in a mold such that it will accurately conform to all parts of the mold and yet not ooze out from the mold. As customarily practiced the resin employed in the hot-press method is in a fusible heat-hardening condition and by itself it does not have the restricted flow required for molding; the flow is controlled through the addition of inert fillers. The inert fillers, however, destroy the resin transparency. Attempts have been made heretofore to prepare a moldable resin without added filler by heating a resin to advance it to a condition of restricted flow; the heating of a resin to this extent, however, renders its flow so sluggish that it is difficult and generally impossible to mold therefrom articles that are at all intricate in design, and molded articles which have been so made heretofore have been found almost completely lacking in mechanical strength and generally devoid of a homogeneous structure as shown by the partial absence of or variableness in transparency or translucency (see Ellis on Synthetic Resins, 1923 edition, page 164 and again in the 1935 edition, page 467).

In general there are requirements that must be met by a plastic or hot-press molding composition. The molding time cycle is of primary importance, since expensive molds and presses are used; accordingly no plastic molding composition is acceptable to the trade that does not have a rapidity or speed of hardening such as to set up in a small mold within a period of from 1 to 3 minutes at a temperature of about 130–150° C.; and a further requirement is a composition giving an article that can be discharged hot from the mold without sticking or blistering to thereby obviate a separate cooling of the mold. The industry, moreover, demands a molding material which will preform, i. e., cold-press into tablets of sufficient rigidity to be handled, in order to facilitate loading of a mold. In addition the flow of a molding composition should be such that pressures of more than 3000 lbs. per sq. in. are not required in a molding operation; higher pressures entail added expense in building dies capable of withstanding them. The molded article as discharged from the mold must have in addition to uniformity of structure and good surface appearance, good mechanical strength to withstand the usage for which it is intended, and resistance to shock, i. e. toughness, is also a highly desired property.

The present invention provides synthetic resinous compositions which meet the foregoing requirements and are capable of being molded without the addition of inert fillers and thus retain the transparent property of the resin. From such compositions articles of intricate design can be molded in accordance with trade demands, and the finished articles in the transparent form are found to possess the mechanical strength equal to the average articles prepared from molding materials containing fillers.

These results are attained by first preparing a phenol-aldehyde resin of the fusible type, i. e. a resin which is at the utmost but slowly heat-reactive, and then treating such a resin, after the incorporation of a hardening agent and an alkaline catalyst to convert it to a typically heat-reactive type, by hot rolling or equivalent mechanical working operation until it is transformed into a state where the insolubility in solvents such as alcohol or acetone ranges from 30 to 60 per cent. This transformation is otherwise indicated by a change in the physical appearance of the resin composition during the hot rolling or equivalent working operation; a coarsely ground resin composition when first charged on the heated rolls forms layers with long hairy surfaces gradually becoming stringy, but toward the end of the rolling operation it quite suddenly changes on the rolls into crepy, rubbery layers that can be stripped therefrom. If the layers are removed before they reach the crepy, rubbery appearance the resin composition is apt to blister during a molding of the composition and form gas pockets; while if the rolling is continued for a material length of time thereafter there is a lack of proper binding action in a molding operation and the molded articles are uneven and spotty. These limitations upon the amount of rolling are otherwise expressed by the extent of insolubility of the composition in alcohol or acetone. The mechanically worked resin upon cooling and grinding is in condition for molding.

The fusible or slowly heat-reactive type of resin used in the practice of this invention is preferably obtained by condensing phenol and formaldehyde in approximately equimolecular proportions in the presence of an acid catalyst until a separation into a resinous and aqueous layer occurs and continuing the heating for some time thereafter to raise its melting point; the resin is separated and thoroughly washed to remove the acid catalyst. As an example about equimolecular proportions of phenol and 37% aqueous formaldehyde and about 0.5 per cent of 3 N. hydrochloric acid based on the weight of phenol are refluxed in a kettle for 35 minutes or for about 20 minutes after the separation into a resinous and aqueous layer has occurred; the resin is separated and washed about three times with water and then dehydrated by heating under a partial vacuum to about 140° C. giving a resin having a melting point ranging from 70–85° C. Other methods and proportions can be used in preparing the resin; and it is not essential that it be entirely of the fusible or slowly heat-reactive type, for it may include in part up to about 50 per cent or even more of a resin which is typically heat-reactive, such as a one-step resin obtained from substantially equimolecular proportions of phenol and formaldehyde by the aid of a basic catalyst.

To the fusible resin is then added a hardening agent such as hexamethylenetetramine (which also supplies the alkaline catalyst) in an amount sufficient to form a typically rapid heat-hardening resin from the fusible resin, and about 5 to 25 per cent of water is included. The incorporation of the hardening agent is preferably carried out by charging the fusible resin into a kneader and heating to about 105 to 115° C. and including about 1 per cent of a lubricant such as stearic acid, amino stearin, phenyl stearate, ammonium stearate, diglycol stearate, calcium stearate, glycerol mono-stearate, etc.; the hexamethylenetetramine is preferably suspended in about 7.5 per cent by weight of water based on the resin, and this suspension (or solution with the higher percentages of water) is then mixed with the fusible resin in the kneader while the temperature is maintained. The amount of hexamethylenetetramine to be added usually ranges from 10–15 per cent of the weight of the resin depending upon its reactivity, and greater or less quantities of water can be used ranging from 5 to 25 per cent. After thorough mixing in the kneader a plastifying agent can be included such as ethylene glycol diacetate, ethylene glycol monoethyl ether acetate, propylene glycol, diethylene glycol monomethyl ether, etc.; about 3 to 5 per cent of such an agent is included though higher percentages can be added where increased flexibility is preferred. The mixing in a kneader is continued with a maintenance of the temperature until there is an incipient evolution of ammonia gas and a thickening tendency is shown on the part of the resin. The composition is thereupon rapidly chilled to about 30° C. by discharging into pans in thin layers. The cold heat-reactive resin composition so formed, which at this point is still almost completely soluble in alcohol and acetone, is brittle and can be granulated. Thereupon follows the hot rolling or mechanical milling of the composition.

The foregoing step of converting the fusible resin into a heat-reactive type as a step separate from that of the succeeding hot-rolling step materially shortens the process of preparing the composition; actual operation has demonstrated that the time period of the process can be reduced to about one-sixth. The inclusion of water (or other suitable solvent for the hardening agent) is found to be of material importance, and to have substantial effect on the character of product obtained; for one thing it insures a thorough mixing of the ingredients with the avoidance of localized overheating. With about 25 per cent of water included when hexamethylenetetramine is the hardening agent used, complete solution of the hardening agent is obtained, but with such amounts, however, more water is present than is desirable in the converted resin for the later grinding of the resin; accordingly it is preferred to remove the excess amount of water by means of vacuum distillation and this can be accomplished for example by carrying out the process step in a still or vacuum kneader.

The mechanical working of the resinous composition whereby it is brought to the crepy rubbery condition while warm, or to the condition where a test shows that it is from about 30 to 60 per cent insoluble in alcohol or acetone, is most conveniently accomplished by means of mixing rolls heated to a temperature of preferably 90 to 115° C. The resinous composition which has been coarsely ground to about 4 mesh is charged in quantity to form a sheet of about ⅛″ in thickness on the rolls; for instance about 1 kilo is required for a 6″ x 16″ mixing roll. At the end of the rolling operation the resinous composition is in a condition to be stripped from the rolls, and after cooling it is ground. The resinous composition can then be molded.

The effect of the hot-rolling on the alcohol- and acetone-insolubility of the resin is shown by the following table:

|  | Alcohol insolubility | Acetone insolubility |
| --- | --- | --- |
| Resin before adding hexa | 0.0 | 0.0 |
| Resin incorporated with hexa prior to rolling | 10.1 | 6.9 |
| 1 minute rolling | 28.7 | 18.2 |
| 2 minute rolling | 41.0 | 32.4 |
| 3 minute rolling | 51.4 | 49.7 |
| 4 minute rolling | 59.2 | 58.6 |
| 4 minute rolling plus a couple of squeeze passes on lighter rolls | 60.6 | 60.0 |

The resinous composition treated by a four minute roll has been found best for commercial molding; satisfactory results, however, have been obtained with a composition rolled within the range of from 2 to 4 minutes when in the amounts giving sheets or layers about ⅛″ thick and at temperatures of 90 to 115° C.

Resinous compositions prepared in accordance with the foregoing and with the degree of insolubility as stated show a flow on a flow tester of about 0.3 to 1.2 inches at 1000 pounds pressure at 150° C.; the flow tester is that described by Peakes in a series of articles published in Plastic Products for 1934. They can be preformed if desired and molded without fillers into transparent or translucent shapes of intricate design and can be discharged hot without blistering or sticking to the mold. Moreover for small articles it has been found that the molding cycle does not exceed three minutes and the finished molded objects possess a mechanical strength equivalent to similar articles molded from the usual resin and filler compositions. In addition it has been found that the objects possess high resistance to shock usually in excess of 1½ ft. lbs. per in. sq.

Numerous variations can be made in the steps of the process herein-described; some of these variations have been heretofore indicated. The fusible resin can be prepared from the higher homologs of phenol such as cresol or xylenol at least in part; a very satisfactory phenolic mixture is that consisting of 90% phenol and 10% cresol. As the acid condensing agent there can be substituted equivalent amounts of other mineral acids as sulphuric acid or such organic acids as oxalic acid, citric acid, etc.; the reaction can be carried out under pressure if desired, in which case a lesser percentage of catalyst is used or the catalyst can be entirely omitted and thereby eliminating the necessity of washing the resin. The dehydration of the resin can be carried out at atmospheric pressure, but the reaction is preferably continued to the point where the melting point of the resin is at least 70° C. In place of hexamethylenetetramine there can be substituted other hardening agents including basic catalyst as furfuramide, aniline formaldehyde, etc.; or a hardening agent such as paraform or other bodies engendering formaldehyde or other methylene-containing bodies, etc. together with basic catalyst as sodium hydroxide, alkylamines, alkaline earths, alkyl substituted ammonium hydroxides, etc. When adding the hardening agent it has been found particularly advantageous to disperse the agent in suitable solvent (water being preferred but other solvents as alcohol or mixtures with water can be used), since this permits its more uniform distribution and prevents any localized overheating in the heat treatment; an overheated resin composition does not flux or flow readily even when mixed with a more fusible resin and gives a resulting structure which is lacking in strength and resistance to shock. The plastifying agents which are preferred are the esters which are to an extent hydrolyzable by water or which are high boiling compounds containing at least one free hydroxy group and which have complete miscibility with water, (such as the ethers and esters formed from ethylene and diethylene glycols and the ethylene and diethylene glycols themselves). The quantity of resin charged upon the mixing rolls will vary with the size of the rolls, but the thickness of the sheets or layers formed on the rolls should not exceed about ⅛".

The resinous compositions of this invention have proven useful for the molding of ornaments, buttons, cold cream jars, measuring cups, thermometer cases, photographic trays, graduates, lenses for automobile tail-lights, etc. They are particularly suitable not only where transparency is desirable but also where a high degree of moisture resistance is demanded, for the molded products without any filler content have a far greater resistance to both hot and cold water than the usual molded products containing wood flour filler. Fillers and other ingredients can be included without deleterious effect on the molding properties; in fact much superior results are obtained as compared with the usual molding compositions of the same filler content.

What is claimed is:

1. Process of preparing a resinous product having plastic flow under the combined action of heat and pressure suitable for hot-press molding without the presence of filler which comprises forming a resin of the fusible type from a phenol and an aldehyde in the presence of an acid catalyst and reacted to a melting point of 70° C. or higher, kneading therewith at a temperature ranging from about 105 to 115° C. a hardening agent in amount to form a heat-reactive resin under basic conditions together with from 5 to 25 per cent by weight of water and a plastifying agent selected from the group consisting of ethylene and diethyleneglycols and the ethers and esters thereof, discharging the product in thin layers to cool, granulating the cooled product, mechanically working the granulated product between rolls heated to about 90-115° C. until the product takes on a crepe rubber appearance and is characterized by an insolubility in alcohol or acetone ranging from 30 to 60 per cent, stripping the product from the rolls, and grinding the product.

2. Process of preparing a resinous product having plastic flow under the combined action of heat and pressure suitable for hot-press molding without the presence of filler which comprises forming a phenol resin of the fusible type reacted to a melting point of 70° C. or higher, mixing therewith a hardening agent in amount to form a heat-reactive resin together with water, mechanically working between heated rolls until the product takes on a crepe rubber appearance and is characterized by an insolubility in alcohol or acetone ranging from 30-60 per cent, and stripping the product from the rolls.

3. Process of preparing a resinous product having plastic flow under the combined action of heat and pressure suitable for hot-press molding without the presence of filler which comprises preparing a heat-reactive resin from a phenol resin of the fusible type by the incorporation of a hardening agent, and mechanically working the resin until the product takes on a crepe rubber appearance and is characterized by an insolubility in alcohol and acetone ranging from 30 to 60 per cent.

4. Process of preparing a resinous product having plastic flow under the combined action of heat and pressure suitable for hot-press molding without the presence of filler which comprises mixing a phenol resin of the fusible type having a melting point of 70° C. or higher with a hardening agent in amount to form a heat-reactive resin together with a small proportion by weight of water, mechanically working the mixture until the product takes on a crepe rubber appearance and is characterized by an insolubility in alcohol or acetone ranging from 30 to 60 per cent.

5. Plastic product moldable under the combined action of heat and pressure without the presence of filler comprising as components a phenol resin of the fusible type having a melting point of 70° C. or higher and included therewith a hardening agent in amount to form a heat-reactive resin together with water and a plastifying agent selected from the group consisting of ethylene and diethylene glycols and ethers and esters thereof, said product having a physical appearance caused by mechanically working on hot rolls of a crepe rubber character and characterized by insolubility in alcohol and acetone ranging from 30 to 60 per cent.

6. Plastic product moldable under the combined action of heat and pressure without the presence of filler comprising as components a phenol resin of the fusible type having a melting point of 70° C. or higher and included therewith a hardening agent in amount to form a heat-reactive resin brought to a state of a crepe rubber appearance on hot rolls through mechanical working, said product being characterized by insolubility in alcohol or acetone ranging from 30 to 60 per cent.

JOHNSTONE E. WEELANDS.